United States Patent [19]

Maeda

[11] Patent Number: 4,562,907
[45] Date of Patent: Jan. 7, 1986

[54] WET TYPE CLUTCH/BRAKE DEVICE MOUNTED IN A FLYWHEEL

[75] Inventor: Nobuyoshi Maeda, Kanagawa, Japan

[73] Assignee: Aida Engineering, Ltd., Kanagawa, Japan

[21] Appl. No.: 460,048

[22] Filed: Jan. 21, 1983

[30] Foreign Application Priority Data

Jan. 27, 1982 [JP] Japan .................. 57-8808[U]

[51] Int. Cl.$^4$ ............................................. B60K 41/24
[52] U.S. Cl. .................................................. 192/18 A
[58] Field of Search ............................ 192/18 A, 12 C

[56] References Cited

U.S. PATENT DOCUMENTS

| | | |
|---|---|---|
| 3,638,773 | 2/1972 | Lewis et al. ............... 192/18 A |
| 3,835,971 | 9/1974 | Spanke et al. ............. 192/18 A |
| 3,946,840 | 3/1976 | Sommer . |
| 4,122,926 | 10/1978 | Spanke et al. ............. 192/18 A |
| 4,135,611 | 1/1979 | Spanke ...................... 192/18 A |
| 4,432,443 | 2/1984 | Sommer ..................... 192/18 A |

FOREIGN PATENT DOCUMENTS

| | | |
|---|---|---|
| 1625835 | 1/1972 | Fed. Rep. of Germany . |
| 3011589 | 10/1981 | Fed. Rep. of Germany . |
| 1265267 | 3/1972 | United Kingdom . |
| 498433 | 4/1976 | U.S.S.R. . |

OTHER PUBLICATIONS

Periodical "Blech" Coburg, 16, (1969), No. 10, pp. 583-584, FIG. 19b.

Primary Examiner—George H. Krizmanich
Attorney, Agent, or Firm—Wenderoth, Lind & Ponack

[57] ABSTRACT

A wet-type clutch/brake device is housed about a rotatable shaft within a recess in a flywheel. A cylinder member surrounds the shaft at a position between a brake and a clutch of the device and is urged toward the brake by springs. Air is introduced into a cylinder chamber to urge the cylinder member against the force of the springs toward the clutch. A cover member closes the open end of the recess, and an oil supplying passage extends through the cover member into the recess to supply lubricating and cooling oil to the brake and clutch.

2 Claims, 1 Drawing Figure

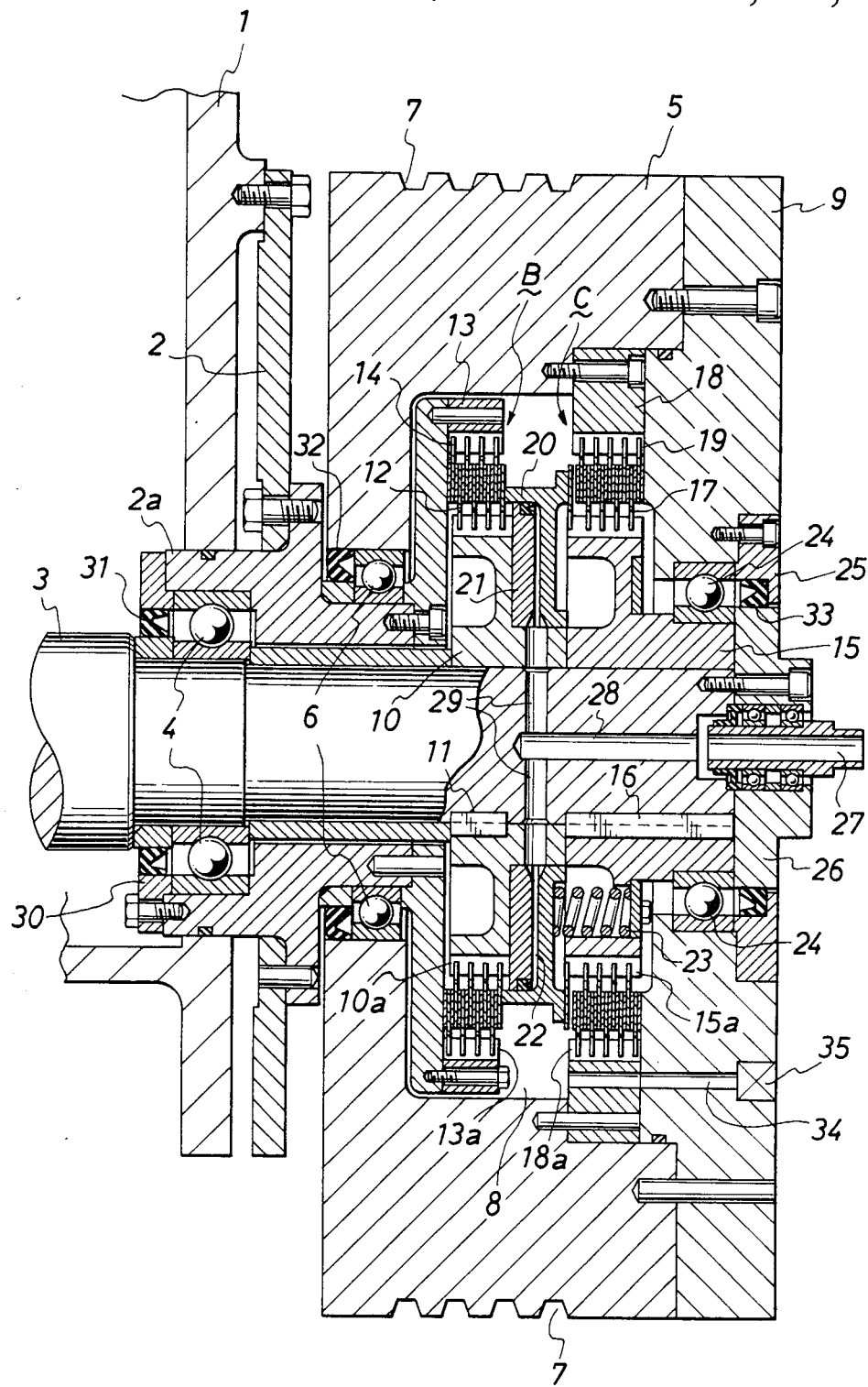

WET TYPE CLUTCH/BRAKE DEVICE MOUNTED IN A FLYWHEEL

BACKGROUND OF THE INVENTION AND DESCRIPTION OF THE PRIOR ART

The present invention relates to a clutch/brake device of the wet type which is mounted inside a flywheel used for a mechanical press. The term "wet type" as employed herein indicates a clutch/brake device mounted within sealed oil.

In a mechanical press of the prior art, a clutch/brake device thereof tends to become very hot as the press operation is repeated, and the heat generated from such a clutch/brake device mounted on a large size press becomes too great an amount to be cooled spontaneously. It has been proposed that a clutch/brake device be sealed in oil so as to be operated within cooling. All such proposed devices, however, are provided between the outer side of a flywheel and a press body. This makes the overall structure too complicated because piping must be provided for supplying the cooling oil to the clutch and the brake as well as lubricant oil to the flywheel. It further requires an additional mechanism to prevent leakge of oil from the piping.

Such clutch/brake devices are also detrimental in that they require meticulous aligning operations since they are assembled by aligning rotating parts with the press body.

OBJECTS AND BRIEF SUMMARY OF THE INVENTION

The main object of the present invention is to provide a clutch/brake device which can be housed compactly in a chamber formed in a flywheel so that an oil supply system thereof can be of simplified structure.

In the device according to the present invention, a chamber is formed in recess within a flywheel and a cover member is provided to cover such chamber so as to seal the chamber in the flywheel. A clutch and a brake are mounted in the chamber, and oil is filled into the chamber. The clutch and the brake each comprise a plurality of friction plates, and means is provided to press the brake plates and the clutch plates alternately.

The brake according to the present invention is positioned in the direction of the bottom of the recess in the flywheel while the clutch is positioned in the direction of the cover member. A cylinder mechanism is interposed between the brake and the clutch. Compressed air is supplied to the cylinder mechanism through a rotational shaft for actuation of the clutch/brake device.

Bearings are attached to all the members which are mounted on the rotational shaft, i.e. the flywheel, the press body and the cover member, and each bearing is provided with an oil seal. Thus cooling oil for the clutch/brake device can be utilized as the lubricant oil for bearings, and no leakage of oil occurs.

The device can be made compact in size to facilitate its mounting to a mechanical press with the structure mentioned above, with the clutch/brake device entirely housed in the flywheel.

BRIEF DESCRIPTION OF THE DRAWING

The invention will now be described in greater detail with reference to the accompanying drawing which is a cross sectional view of the device of the invention as assembled.

DETAILED DESCRIPTION OF THE INVENTION

A preferred embodiment of the present invention will now be described referring to the drawing.

A rotational shaft 3, or a crank shaft, to drive a press ram is rotationally provided via bearings 4 inside a boss 2a of a bracket 2 which is fixed in a detachable manner on a body 1 which constitutes a part of a mechanical press. A flywheel 5 is rotatably mounted via bearings 6 on the outside of the boss 2a. Belt grooves 7 are formed on the outer periphery of the flywheel, and the flywheel is driven by a belt from a motor (not shown) mounted on the press body 1. The flywheel 5 is provided with a recessed chamber 8 and a cover member 9 is fixedly provided to seal the chamber 8. The clutch and the brake to be described hereinafter are mounted entirely within the chamber 8.

The rotational shaft 3 extends to the cover member 9. A brake hub 10 is fixed on the rotational shaft 3 by means of a key 11 in the chamber 8. A plurality of friction plates 12 have inner teeth which are to be engaged with outer wheel teeth 10a provided on the outer periphery of the brake hub 10. A brake housing 13 is interposed between the bottom wall of the recess in the flywheel 5 and the brake hub 10 and is fixed on boss 2a of bracket 2 in a manner that a peripheral portion of housing 13 opposes the outer teeth 10a of the brake hub. A plurality of friction plates 14 have outer teeth which are to be engaged with inner teeth 13a of housing 13. These two types of friction plates 12 and 14, are alternately arranged between each other. A brake B thus comprises the brake hub 10, the brake housing 13, and two types of friction plates 12, 14.

A clutch hub 15 is fixed by means of a key 16 on the rotational shaft 3 at a position adjacent to the brake hub 10. Plural friction plates 17 have inner teeth which engage with outer teeth 15a provided on the outer periphery of the clutch hub 15. Plural friction plates 19 have outer teeth which engage with a inner teeth 18a of the clutch housing 18 which is fixed on the flywheel 5 and opposes the outer periphery of the clutch hub 15. The friction plates 19, 17 are alternately mounted between the friction plates 17, 17. A clutch C thus comprises clutch hub 15, clutch housing 18, and two types of friction plates 17, 19.

A cylinder 20 is provided between the brake B and the clutch C in a manner such that opposite peripheral end surfaces of cylinder 20 abut respective end friction plates 12 or 14 of the brake and 17 or 19 of the clutch. Cylinder 20 defines a chamber 22 together with a piston 21. The cylinder 20 is pressed toward the brake B by means of springs 23 fixed on the clutch hub 15. A plurality of the springs 23 are arranged around the periphery of the cylinder to maintain a good balance and to press the cylinder with a uniform force. The cylinder 20 does not contact the clutch C at locations where springs 23 contact the cylinder 20.

Bearings 24 are interposed between the clutch hub 15 and the cover member 9 and a set plate 25 supporting the outer race of bearing 24 is fixed to the cover member 9. The end of the rotational shaft 3 is provided with an end plate 26 which also supports the inner race of the bearings 24, and an air supply pipe 27 is mounted at the center of the end plate 26 in a manner to enable rotation therebetween. An air passage 28 is provided at the center of the rotational shaft in the axial direction to communicate with the air supply pipe 27. The air passage 28 extends to the cylinder chamber 22 of the cylinder 20 via branch pipes 29.

When compressed air is not supplied from the air supply pipe 27 to the cylinder chamber 22, the cylinder 20 is pressed by the springs 23 against the brake B, thereby fixing the rotational shaft 3 to the press body 1 via the brake housing 13 and the bracket 2. When compressed air is supplied from the air supply pipe 27, the cylinder 20 is moved against spring 23 and thus releases the brake B, presses against the clutch C to engage the same, and thus transmits the revolution of the flywheel 5 to the rotational shaft 3 via the housing 18, friction plates 19, 17 and hub 15.

The bearings 4 interposed between the bracket 2 and the rotational shaft 3 are supported by a bearing support 30, and a sealing member 31 is provided between the bearing support 30 and the rotational shaft 3. On the outer side of the bearings 6 between the flywheel 7 and the bracket 2 is provided a sealing member 32. On the outside of the bearing 24 between the clutch hub 15 and the cover member 9 is provided another sealing member 33. These three sealing members seal the flywheel chamber 8 for preventing oil leakage.

The cooling oil for the friction plates 12, 14 of the brake and the clutch and 17, 19 of the lubricant oil for the bearings 4, 6, 24 are fed through an oil passage 34 which extends from the covering member 9 via the clutch housing 18 to the chamber 8. The oil passage 34 is provided with an oil plug 35 so that the oil once supplied will not leak to the outside.

What is claimed is:

1. In an assembly of the type including a fixed machine body, a shaft mounted for rotation with respect to said body, a flywheel mounted about said shaft for rotation with respect thereto and for rotation with respect to said body, brake means operable when engaged to prevent rotation of said shaft relative to said body and operable when disengaged to enable rotation of said shaft relative to said body, and clutch means operable to be engaged when said brake means is disengaged to transmit rotation of said flywheel to said shaft and operable to be disengaged when said brake means is engaged to interrupt transmission of rotation of said flywheel to said shaft, the improvement comprising:

a recess formed in said flywheel and extending axially from an open end thereof spaced from said body to a closed end adjacent said body, said shaft extending coaxially through said recess, said reces defining an annular chamber between said shaft and said flywheel;

a cover member closing said open end of said recess, said cover member being fixed to said flywheel and rotatable therewith;

said brake means comprising an annular brake hub fixed to said shaft within said recess adjacent said closed end thereof, said brake hub having outer peripheral teeth, an annular brake housing fixed to said body and positioned within said recess at said closed end thereof, said brake housing having inner peripheral teeth surrounding said outer peripheral teeth of said brake hub, a plurality of inner friction plates engaged with said outer teeth of said brake hub, and a plurality of outer friction plates engaged with said inner teeth of said brake housing, said inner and outer friction plates being arranged alternately between and in engagement with each other;

said clutch means comprising an annular clutch hub fixed to said shaft within said recess adjacent said cover member, said clutch hub having outer peripheral teeth, an annular clutch housing fixed to said flywheel and positioned within said recess adjacent said cover member, said clutch housing having inner peripheral teeth surrounding said outer peripheral teeth of said clutch hub, a plurality of inner friction plates engaged with said outer teeth of said clutch hub, and a plurality of outer friction plates engaged with said inner teeth of said clutch housing, said outer and inner friction plates being arranged alternately between and in engagement with each other;

a cylinder member surrounding said shaft between said clutch means and said brake means within said annular chamber of said recess, said cylinder member having first and second opposite axial annular ends directed toward said friction plates of said brake means and said friction plates of said clutch means, respectively, for alternate abutment therewith;

a piston member positioned radially with said cylinder member and defining therewith a cylinder chamber;

spring means positioned between said clutch hub and said cylinder member for biasing said cylinder member in a first axial direction toward said friction plates of said brake means and away from said friction plates of said clutch means, and thereby for engaging said brake means and disengaging said clutch means;

an air passage extending through said shaft and connected to said cylinder chamber;

means for supplying compressed air through said air passage into said cylinder chamber for moving said cylinder member against the force of said spring means in a second axial direction toward said friction plates of said clutch means and away from said friction plates of said brake means, and thereby for engaging said clutch means and disengaging said brake means; and means extending through said cover member for supplying oil into said recess for cooling said brake means and said clutch means.

2. The improvement claimed in claim 1, further comprising an annular end plate fixed to an end of shaft at a position radially inwardly of said cover member, and wherein said compressed air supplying means comprises an air supply pipe extending through said end plate, said end plate being rotatable about said air supply pipe.

* * * * *